United States Patent [19]

Niemann

[11] 4,113,158
[45] Sep. 12, 1978

[54] LUGGAGE CARRIER FOR TWO-WHEEL VEHICLES, SUCH AS BICYCLES

[75] Inventor: Heinz Niemann, Herford, Fed. Rep. of Germany

[73] Assignee: ESGE-MARBY GmbH & Co., Bielefeld, Fed. Rep. of Germany

[21] Appl. No.: 776,421

[22] Filed: Mar. 10, 1977

[30] Foreign Application Priority Data

Jun. 2, 1976 [DE] Fed. Rep. of Germany ... 7617628[U]

[51] Int. Cl.² ................................................ B62J 7/04
[52] U.S. Cl. ...................................... 224/39; 224/32 A
[58] Field of Search ..................... 224/31, 32 R, 32 A, 224/33 R, 33 A, 30 R, 30 A, 35, 36, 37, 38, 39, 40, 41; 280/202, 289 R, 289 A

[56] References Cited

U.S. PATENT DOCUMENTS

| 621,722 | 3/1899 | Stanier | 224/39 |
|---|---|---|---|
| 3,923,218 | 12/1975 | Niemann | 224/32 A |

FOREIGN PATENT DOCUMENTS

| 979,422 | 4/1951 | France | 224/32 A |
|---|---|---|---|
| 551,978 | 4/1923 | France | 224/30 R |
| 779,785 | 1/1935 | France | 224/39 |
| 1,008,904 | 5/1952 | France | 224/30 R |
| 449,570 | 2/1926 | Fed. Rep. of Germany | 224/30 R |

*Primary Examiner*—Trygve M. Blix
*Assistant Examiner*—Winston H. Douglas
*Attorney, Agent, or Firm*—Flynn & Frishauf

[57] ABSTRACT

To permit accurate adjustment of a luggage carrier with respect to a bicycle frame, the luggage carrier is secured at one end to the bicycle frame, typically the rear fork thereof, and additionally has two pairs of rod-like supports located at staggered distances longitudinally along the frame, one rod, each, of a pair being arranged to converge towards the axle position of the frame and being bent at the terminal end, preferably flattened, to permit relative adjustment of the free ends of adjacent rod elements with respect to each other, and with the frame, preferably by a claw clamp seating against serrated surfaces on the ends of the rods.

9 Claims, 6 Drawing Figures

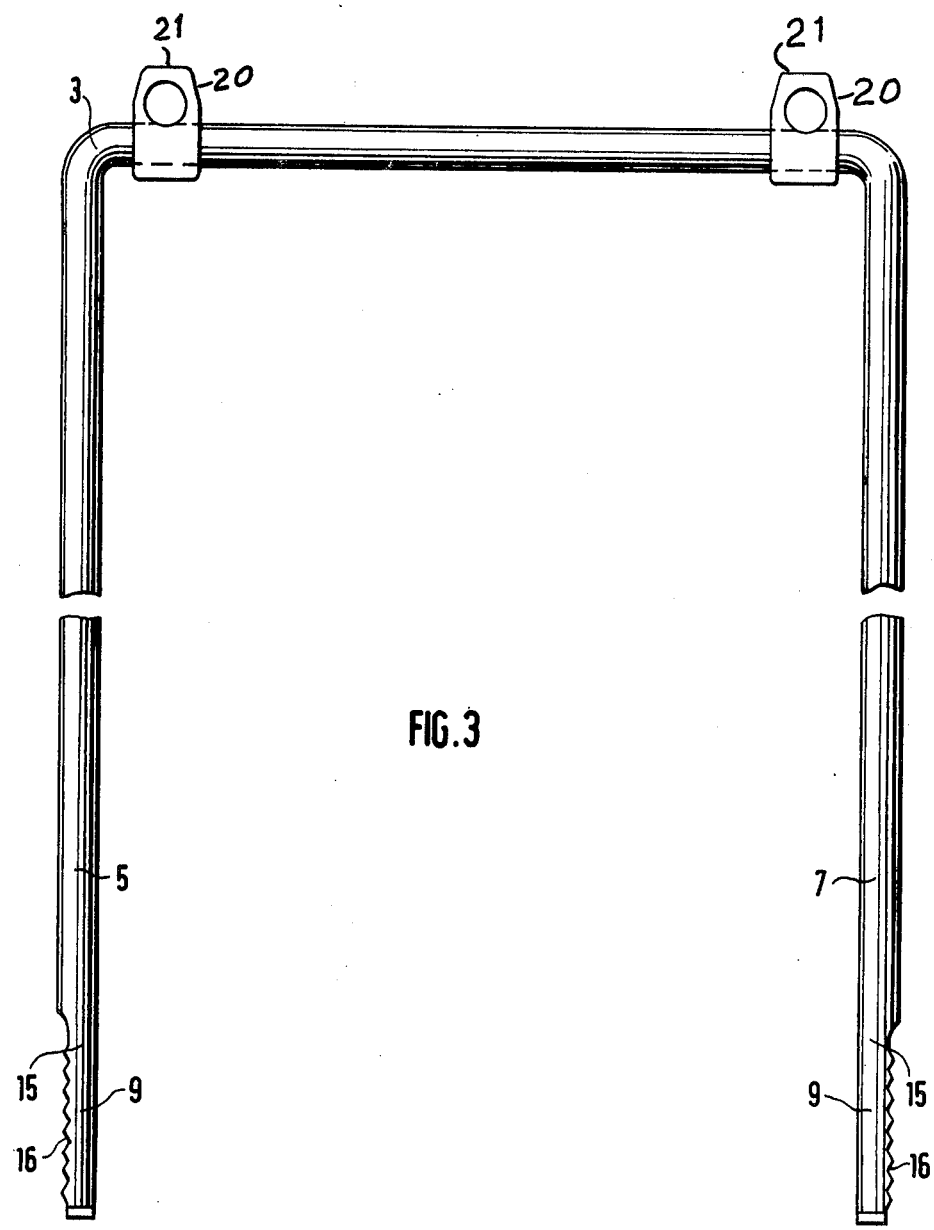

LUGGAGE CARRIER FOR TWO-WHEEL VEHICLES, SUCH AS BICYCLES

Cross reference to related to patents, assigned to the assignee of the present application:

U.S. Pat. No. 3,910,471, Niemann
U.S. Pat. No. 3,923,218, Niemann
U.S. Pat. No. 3,779,435, Niemann
U.S. Pat. No. 3,616,977, Zurmuhlen The present invention relates to a luggage carrier for two-wheel vehicles, and more particularly to a bicycle luggage carrier for attachment to the rear frame of the bicycle, in which the luggage carrier is formed with a support surface attached at one end to the frame of the bicycle and maintained in position over the rear wheel of the bicycle by support struts or support rods.

The support struts or support rods attaching the luggage carrier support surface formed, for example, as an elongated frame, to the bicycle itself is usually done by attaching the lower ends of the support rods or struts to a portion of the bicycle frame located adjacent the axle of the rear wheel, or to the axle itself. Some luggage carriers have been proposed in which two pairs of support rods or struts are provided, fixed with respect to each other, to form a triangular support brace for the luggage carrier. The two struts, at either side of the wheel, together with the luggage carrier frame form a stiff triangle, the lower ends of which are welded, or otherwise attached to an eye for attachment to the frame of the bicycle. This arrangement has the disadvantage that the luggage carrier must be carefully matched to the diameter of the wheel of the bicycle and cannot be secured to bicycles having various wheel diameters. Various types of bicycles have wheels of different diameters, and even the wheel sizes of adult-type bicycles vary in accordance with the type of bicycle, and the outer dimension of the wheels in accordance with the tires used therewith. Different types of rims also will result in different effective diameters since the actual diameter of the wheel and the tire may vary from vehicle to vehicle, and depend, to some extent, on tire pressure. The tire and wheel diameter is not a critical dimension in a bicycle and thus even series-manufactured bicycles show tolerances in wheel diameter.

The luggage carrier should preferably be so secured to the bicycle that it is essentially horizontal, or has a predetermined tilt, as desired by the user. In order to permit such adjustment, it has been proposed to form the eyelet for attachment of the support struts or support rods to the axle region of the bicycle in elongated, elliptical form in order to permit some longitudinal adjustment; in another form, the strut end is formed with a plurality of adjacently located attachment holes, the user selecting the hole which fits the particular bicycle and desired angle of the luggage carrier. Forming the eyelet in elongated form permits only small adjustments, and providing a plurality of holes does not permit fine adjustment and does not accomodate matching the luggage carrier to various types of bicycles. An accurate adjustment of the angular position of the carrier is difficult and frequently impossible.

It is an object of the present invention to provide a luggage carrier in which the support struts are so arranged that the eventual position of the luggage carrier on the bicycle can be readily determined.

SUBJECT MATTER OF THE PRESENT INVENTION

Briefly, the luggage carrier is formed with a support frame which has two pairs of support struts located longitudinally along the length thereof. Adjacent support struts or support rods, that is, those located at one side of the bicycle of the two pairs, are angled off at the bottom to form essentially parallel end portions to be adjustable, in the parallel position, both with respect to each other as well as with respect to the frame of the vehicle. Preferably, the free ends of the support struts or rods are clamped to the bicycle frame by a U-shaped claw clamp, formed with a screw hole for attachment to a matching screw hole in the frame of the bicycle, or to the axle of the rear wheel, the lower ends of the struts being formed with matching recesses to accept a clamping screw or the wheel axle.

Arranging the strut pairs of the carrier in this manner permits pivoting the strut pairs to the bicycle carrier itself, so that the stiff triangular connection previously determined by the welded eyelet is eliminated. The bicycle carrier can thus be folded flat for shipment and storage. Drawings, illustrating an example:

FIG. 3 is a front view of a strut or rod pair;

Figure 1:
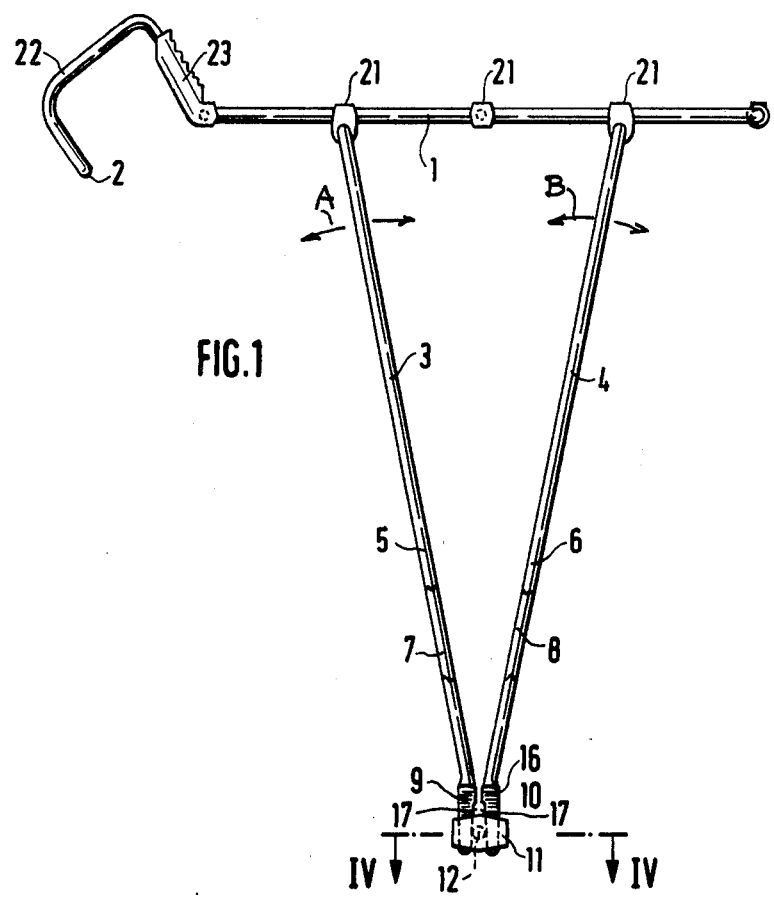
FIG. 1 is a side view of the luggage carrier, shown in assembled position, but removed from a bicycle.
Figure 4:
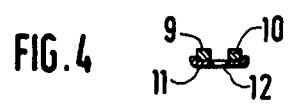
FIG. 4 is a section along line IV—IV of FIG. 1 and showing the claw clamp in greater detail.
Figure 2:
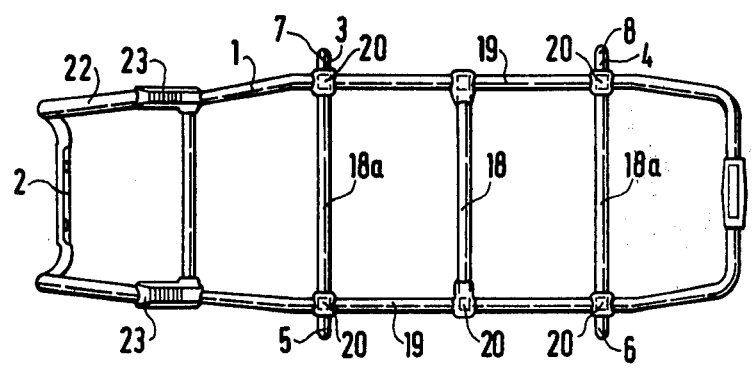
FIG. 2 is a top view.
Figure 5:
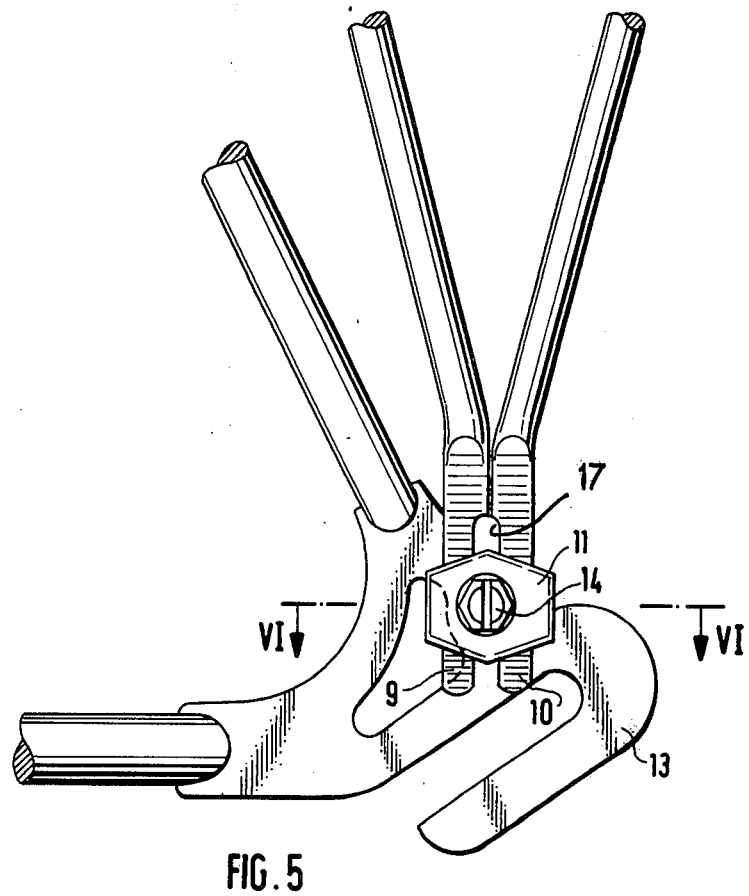
FIG. 5 is a greatly enlarged view showing the end portion of a typical bicycle frame, with the carrier struts assembled thereto.
Figure 6:
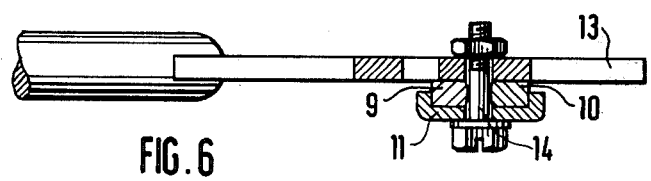
FIG. 6 is a cross section along line VI—VI of FIG. 5.

The carrier (FIG. 1) has a support frame 1 forming a luggage receiving support surface. The forward end is formed with an attachment loop 2 to permit clamping the attachment loop to the cycle frame, specifically to the rear fork of a bicycle. Two pairs of support rods 3, 4 extend downwardly from the forward and rearward portion, respectively, of the frame, staggered along the length thereof. The support rods pair 3 is formed of support rod 5, 7; the support rods pair 4 is formed of support rod 6, 8. Two support rods 5, 6 and 7, 8, respectively, extend on either side of the bicycle. The free ends of the rod pairs 3, 4 merge at their lower side and are angled in such a manner that they form approximately parallel, aligned end portions 9, 10, as best seen in FIGS. 1 and 5. The parallel, aligned end portions 9, 10 are clamped to the frame by a U-shaped claw clamp 11. Claw clamp 11 is formed with a bore or aperture 12 for an attachment screw 14 (FIGS. 5, 6) to pass through the claw, through a recess 17 between the free end portions 9, 10 and through an attachment portion or attachment hole formed in the frame of the bicycle. To end portion of the bicycle frame, which accepts the rear wheel, is shown at 13 (FIGS. 5, 6).

Usually, the rods of the pairs 3, 4 will be made of wire elements of circular cross section. The free end portions 9,10 are flattened, as seen at 15 (FIG. 3), and the flattened surfaces are knurled or serrated, as seen at 16. The recesses 17 to receive the attachment screw 14 are best seen in FIGS. 1 and 5.

The luggage carrier is preferably made of lightweight metal, and includes an elongated frame with cross braces 18. The cross braces 18 are joined to the longitudinal frame elements 19 by plastic attachment moldings 20 which are made by injection-molding the moldings 20 around the adjacent regions of the frame elements 18 and 19. The pairs of struts or rods 3, 4 are pivotally located in the plastic moldings 20; their upper cross elements 18a form the cross braces in the respective regions of the luggage carrier. The plastic moldings 20 are formed with outwardly directed, approximately flat and horizontal surfaces 21 to form bearing supports for articles to be carried on the luggage carrier. Counter elements 23 are molded around an angled-off portion 22 of the luggage carrier to form an end bearing surface for the articles to be carried. The bearing portions 23 are preferably plastic.

The lower end of the rear fork of most bicycles is formed with a wheel attachment end 13 which is hook-shaped, to permit adjustment and adjustable location of the rear axle of the rear wheel of the bicycle. The rear end portion 13 additionally is formed with attachment holes for fenders which can also be used to attach the luggage carrier. Many bicycle frames can be used with different types of wheels having mutually different diameters. Bicycles constructed for wheels of widely different diameters will have relatively different positions of the attachment end, and hence of the hook portion 13 with respect to the remainder of the frame. Thus, the attachment point for the free ends 9, 10 of the support rod pairs 3, 4 and the position of the opening to receive the clamping screw will likewise change with respect to the remainder of the bicycle frame. The position of the end portion 13 also differs with the type of bicycle, the manufacturer, and even in the same series of manufacture variations may occur since the dimensions to mount the wheel are not critical. The construction for the luggage carrier permits compensation for changes in dimensions in the bicycles, and for changes in construction.

Installation and operation: For shipment and storage, the pairs 3, 4 of the struts or rods can be folded essentially flat with respect to the frame 1 of the carrier by removing the claw 11 and swinging the pairs of struts 3, 4 in the direction of the arrows A, B. For assembly, the pairs of rods 3, 4 are flipped downwardly to assume the position shown in FIG. 1, and until the recesses 17 of the free ends 9, 10 match the corresponding bore or hole in the end portion 13 of the bicycle. The U-shaped claw clamp 11 is then placed over the flat portions 15 of the free ends 9, 10, and the attachment screw 14 is introduced and tightened. The knurled surfaces 16 (FIGS. 1, 3), which may have a matching surface on the claw, will hold the longitudinal alignment of the adjacent rods of the rod pairs with respect to each other, and with respect to the bicycle frame. The pivotal mounting of the pairs of support rods or struts 3, 4 permits flat folding for storage and shipment. This is an advantage which is particularly useful in these luggage carriers, although not a necessary feature, and the attachment of the luggage carrier to the bicycle frame can also be carried out with strut pairs which are fixedly or rigidly secured to the frame. The struts or rods usually are made of wirelike material of substantial length; they are therefore quite elastic so that the free end 9, 10 can be shifted in relative position to meet any dimensional changes or variations in the bicycle with which they are to be used. Thus, a fixed or rigid connection of the frame pairs 3, 4 to the bicycle luggage carrier frame is also permissible and permits accurate adjustment of the position of the frame with respect to a wheel.

Various changes and modifications may be made within the scope of the inventive concept.

I claim:

1. Luggage carrier for cycles, such as bicycles, having a cycle frame, said carrier comprising an elongated support frame (1) defining a support plane and having means (2) at one end to secure the support frame to the cycle frame;

two support rod pairs (3, 4) each pair being pivotally secured to the support frame, the rods of each pair being located at a respective side of the support frame and projecting towards the axle of a rear wheel of the cycle, the pairs being staggered along the length of the support frame, whereby the carrier will be supported at three longitudinally staggered points along the length of the support frame and wherein the free end portions (9, 10) of adjacent rods (5, 6; 7, 8) of the support rod pairs (3, 4) are angled with respect to the remainder of the rods and are approximately parallel to each other when placed adjacent each other and adjustable with respect to each other and the rear end portion of the cycle frame (13) so as to adjust the position of the support frame with respect to the rear wheel, an attachment claw clamp (11) fitting around the approximately parallel free ends (9, 10) of the angled portions of the rods to clamp the free end portions of the rods against the rear end portion of the cycle frame (13), the claw clamp being formed with a bore (12);

and a clamping bolt to adjustably tighten the claw clamp to the rear end portion of the cycle frame (13) each of the free end portions of the rods held in an individually relative adjusted position between the clamp and the rear end of the cycle frame.

2. Carrier according to claim 1, wherein the rods are of circular cross section, and the free end portions (9, 10) of the rods (5, 7; 6, 8) are flattened (15) in the region of the claw clamp.

3. Carrier according to claim 1, wherein the free end portions are formed with a knurled or serrated surface (16).

4. Carrier according to claim 3 wherein the claw clamp (11) is a generally U shaped element formed with a surface matching the serrated surfaces (16) on the free end portion (9, 10) of the rods (5, 7; 6, 8) at the inside of the U.

5. Carrier according to claim 1, wherein the end portions (9, 10) of the rods are formed with a facing recess (17) to receive said clamping bolt (14) passing through an opening of the claw clamp (11) and an opening of the rear end portion (13) of the cycle frame.

6. Carrier according to claim 1, further comprising plastic injection molding elements injected around the upper end portions of the rods (5, 7; 6, 8) of the support rod pairs (3, 4) and securing said rods to longitudinal support frame portions (19) of the support frame of the carrier.

7. Carrier according to claim 6, wherein said injection molding elements (20) form pivot bearings for the rods (5, 7; 6, 8) to permit folding said rods flat against the frame (1) for shipment.

8. Carrier according to claim 6, wherein the rod pairs are formed with transverse portions (18a), the transverse portions being secured by said injection molding elements (20) and forming transverse strut portions of the support frame (1) of the carrier.

9. Carrier according to claim 6, wherein the carrier comprises light-weight metal material, and said support frame is an essentially rectangular frame having longitudinal frame portions (19) and cross braces (18), the injection molding elements (20) interconnecting the longitudinal frame portions cross braces and the transverse strut portions.

* * * * *